Figure 1:
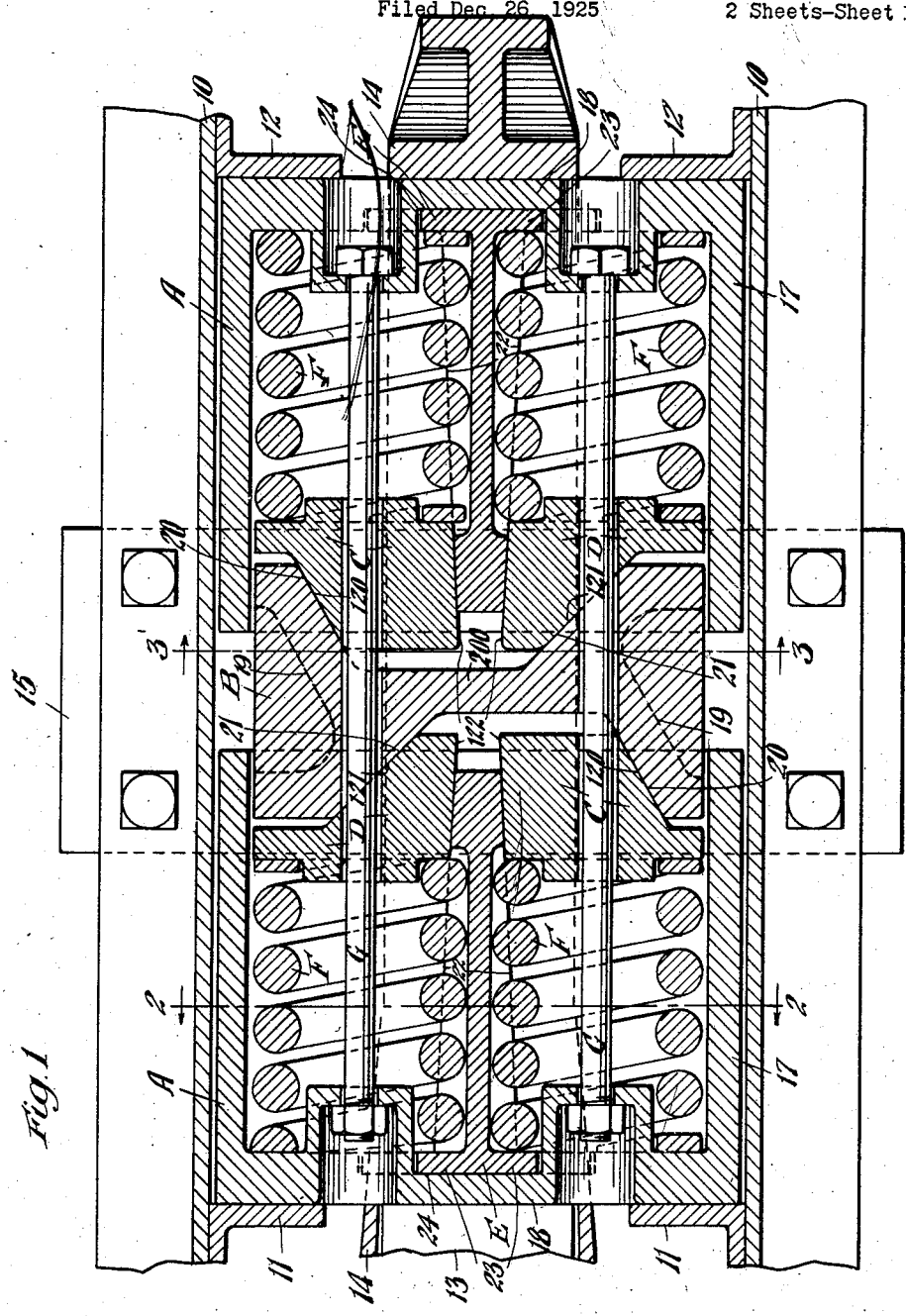

Aug. 30, 1927.

J. F. O'CONNOR 1,640,422

FRICTION SHOCK ABSORBING MECHANISM

Filed Dec. 26, 1925

2 Sheets-Sheet 1

Witness
Wm. Geiger

Inventor
John F. O'Connor
By George I. Haight
His Atty

Aug. 30, 1927.
J. F. O'CONNOR
1,640,422
FRICTION SHOCK ABSORBING MECHANISM
Filed Dec. 26, 1925
2 Sheets-Sheet 2
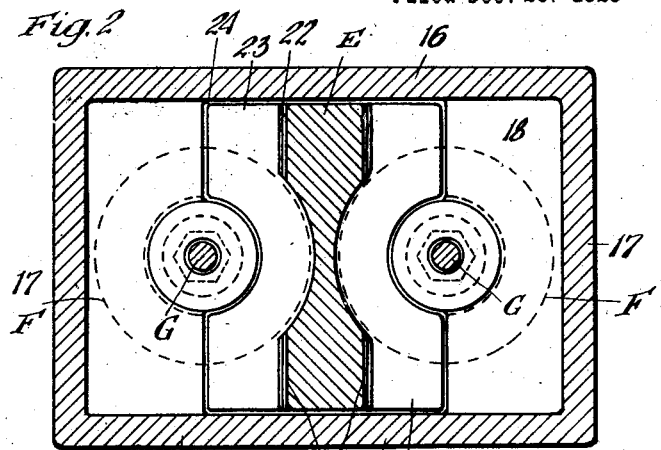
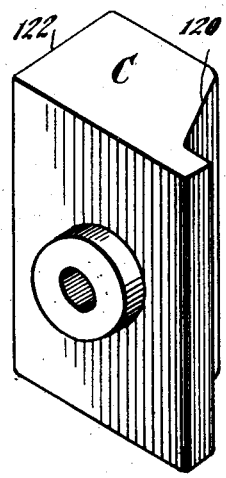
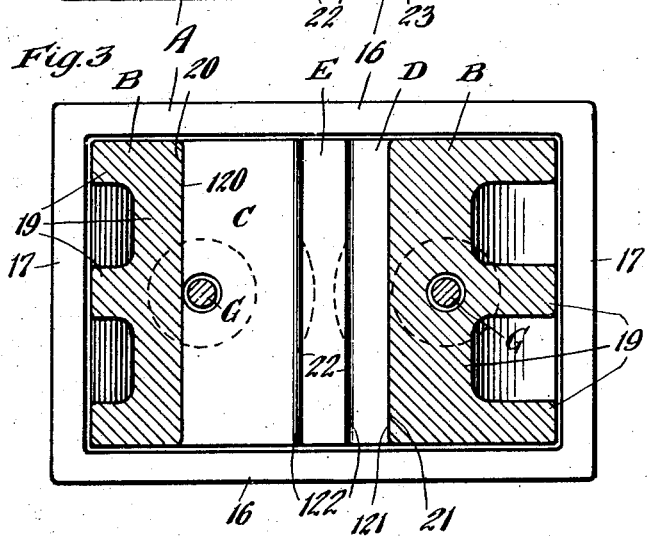
Witness
Wm. Geiger
Inventor
John F. O'Connor
By George I. Haight
His Atty Patented Aug. 30, 1927.

1,640,422

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 26, 1925. Serial No. 77,787.

This invention relates to improvements in friction shock absorbing mechanisms.

One object of the invention is to provide a high capacity friction shock absorbing mechanism of the double ended type, especially adapted for railway draft riggings, employing relatively movable follower elements and a plurality of relatively movable friction elements actuated upon movement of the follower elements, wherein the friction elements are forced into intimate frictional contact by a single rigid member having wedging engagement with certain of the friction elements.

Another object of the invention is to provide a shock absorbing mechanism of the double ended type employing front and rear follower elements having friction posts movable respectively therewith, a plurality of friction shoes co-operating with each post and a central wedge member co-operating with the shoes of both posts.

A further object of the invention is to provide a shock absorbing mechanism of the character indicated in the preceding paragraph, wherein the friction shoes and wedge member have co-operating sets of faces, certain of which are disposed at a relatively keen wedge acting angle with reference to the line of applied force and others of which are disposed at a relatively blunt releasing angle with reference to said line.

Other objects and advantages of the invention will more fully and clearly appear from the description and claims hereinafter following.

In the drawings, forming a part of this specification, Figure 1 is a horizontal, longitudinal, sectional view of a portion of a railway draft rigging, showing my improvements in connection therewith. Figures 2 and 3 are vertical, transverse, sectional views corresponding respectively to the lines 2—2 and 3—3 of Figure 1. And Figure 4 is a detailed, perspective view of a friction shoe employed in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13 to which is operatively connected a yoke 14 of well-known form. The shock absorbing mechanism proper is disposed within the yoke and the yoke in turn is supported by a detachable saddle plate 15 secured to the draft sills.

The improved shock absorbing mechanism proper includes broadly front and rear follower casings A—A; a central wedge member B; two friction shoes C—C; two friction shoes D—D; two friction posts E—E; front and rear pairs of spring resistance elements F—F; and a pair of retainer bolts G—G.

The front and rear casings A are in the form of hollow rectangular box-like castings having spaced, longitudinally disposed top and bottom walls 16—16; spaced, longitudinally disposed, vertical side walls 17—17, and a transverse, end wall 18. The end wall 18 of each casing co-operates with the corresponding stop lugs on the draft sills in the manner of the usual main follower.

The wedge member B is in the form of a relatively heavy block having relatively thick side walls 19—19, and a transverse vertically disposed connecting web 200. On the inner side, each wall 19 is provided with front and rear interior wedge faces. The front wedge face at one side of the block B is designated by 20 while the front wedge face at the opposite side is designated by 21. The wedge faces 20 and 21 are disposed at different angles with reference to the longitudinal axis of the mechanism, the face 20 being disposed at a relatively keen wedge acting angle with reference to said axis, while the face 21 is disposed at a relatively blunt releasing angle with respect to said axis. The rear wedge face at the same side of the block C as the front wedge face 20, is also designated by 21 and is disposed at the same angle as the front wedge face 21 hereinbefore described. The rear wedge face at the same side of the mechanism as the front wedge face 21 is also designated by 20 and is disposed at the same angle as the front wedge face 20. It will thus be evident that the wedge member C is provided with two sets of interior wedge faces, the opposed faces of each set being inclined respectively at a blunt and at a keen angle with reference to the longitudinal axis of the mechanism.

The two friction posts E—E are of identical design, each post having a pair of longitudinally disposed, outwardly diverging flat friction surfaces 22—22 on the opposite sides thereof, adapted to cooperate with the corresponding friction shoes of the mechanism. At the outer end, each post is provided with a pair of laterally projecting flanges 23—23, adapted to be accommodated within a seat 24 formed on the inner side of the end wall 18 of the corresponding casing A. The flanges 23 are of such a thickness that their inner faces will lie flush with the inner face of the end wall 18 of the casing when the flanges are seated in the recess 24. As most clearly shown in Figure 2, the longitudinal friction surfaces 22 of the posts E are cut away at opposite sides to accommodate the inner sides of the twin arranged spring resistance elements F associated with the corresponding casing A.

The friction shoes C—C and D—D are of similar design, except as hereinafter pointed out. Each friction shoe has an inner flat friction surface 122 adapted to co-operate with the friction surface 22 at the same side of one of the posts E. Each shoe also has an outer wedge face co-operating with one of the wedge faces of the wedge block B, the outer wedge face of each shoe C being designated by 120 and that of each shoe D being designated by 121. The wedge faces 121 of the shoes are adapted to co-operate with the blunt wedge faces 21 of the block B while the faces 120 of the shoes C are correspondingly inclined to and co-operate with the keen faces 20 of said wedge block. At the inner end, each shoe has a flat end face adapted to bear on the corresponding end of one of the spring resistance elements F. As most clearly shown in Figure 1, the shoes are arranged in front and rear sets of two, each set comprising a shoe C, and a shoe D. The shoes C and D of each set co-operate with one of the friction posts, the latter being movable with the corresponding follower casing A.

The spring resistance elements F which are four in number, comprise front and rear sets of twin springs. Each spring unit of the twin sets has the inner end thereof bearing on one of the wedge friction shoes, while the outer end thereof bears on the inner surface of the end wall 18 of the corresponding casing A. The outer ends of each set of twin springs also bear on the flanges 23 of the corresponding friction post, thereby holding the post seated in the recess 24 and assuring its return to normal position with the associated casing A. Each spring member F is held in central position by bosses projecting inwardly from the co-operating shoe and the end wall of the casing.

The mechanism is held of overall uniform length and in assembled relation by the retainer bolts G which are arranged at opposite sides of the mechanism and have their front and rear ends anchored respectively in the hollow bosses on the end walls of the front and rear casings, the shank of each bolt extending through aligned openings in the wedge shoes C and D at the same side of the mechanism and an aligned opening in the wedge block B. In addition to holding the parts assembled, the retainer bolts also serve to maintain the mechanism under a predetermined initial compression. Compensation for wear of the various friction and wedge faces is had by the expansive action of the spring resistance elements F. To permit for the necessary relative movement to compensate for wear, clearance is left between the front and rear faces of the wedge block C and the shoes as clearly shown in Figure 1.

The operation of my improved shock absorbing mechanism is as follows, assuming a compression stroke: The front and rear friction shells A are moved relatively toward each other, compressing the springs F and forcing the wedge shoes inwardly toward each other longitudinally of the mechanism. A wedging action will thus be set up between the shoes C and the wedge block B, forcing the shoes into intimate contact with the friction surfaces of the posts. During this time, there will be substantially no wedging action between the blunt faced wedge friction shoes D and the wedge block B. During the continued relative movement of the front and rear casings A, the posts will be carried inwardly therewith and will be moved relatively to the friction shoes C and D. Friction will thus be created between the friction surfaces of the posts and the shoes. As the posts are moved relatively to the shoes, the shoes of each set C and D will be forced apart due to the taper of the posts, thereby effecting a differential action and causing additional compression of the spring resistance elements F. The friction wedge system comprising the wedge block B and the front and rear sets of friction wedge shoes C and D will thus be elongated longitudinally of the mechanism. The described action will continue either until the actuating force is reduced or the inner ends of the casings come into abutment, whereupon the pressure will be transmitted directly through the casings which act as column load transmitting means. When the actuating force is reduced, the spring resistance elements F will restore the casings together with the friction post to normal position. As will be evident the wedge block B will be slightly expanded during the compression of the mechanism, thereby setting up forces therein tending to contract the same when the actuating pressure is reduced. Due to the relatively blunt co-operating faces on the wedge block and friction shoes D, the friction shoes will be squeezed out during contraction of the wedge block B, thereby relieving the pressure on the co-operating keen wedge faces and greatly facilitating the releasing operation.

Although I have herein shown the wedge block and the friction wedge shoes of my improved mechanism as provided with blunt and keen wedge faces, it will be evident that it is within the scope of my invention to dispose all of the wedge faces at the same angle with reference to the longitudinal axis of the mechanism.

While I have herein shown and described what I now consider the preferred form of carrying out my invention, the same is merely illustrative, and I contemplate all changes and modifications that come within the scope of the claims attached hereto.

I claim:

1. In a friction shock absorbing mechanism, the combination with front and rear follower casings; of a friction post movable with each casing, each post having friction surfaces on the opposite sides thereof converging inwardly of the mechanism; a wedge member disposed between said casings and embraced thereby, said member having front and rear sets of opposed interior wedge faces; front and rear pairs of friction shoes, the shoes of each pair co-operating with one of said posts and being disposed at opposite sides of the latter and having friction surfaces co-operating with the friction surfaces of said post, each shoe also having a wedge face co-operating with one of the faces of said wedge member; and twin arranged springs in each casing disposed on opposite sides of the corresponding post and resisting relative movement of said casing and the corresponding friction shoes.

2. In a friction shock absorbing mechanism, the combination with front and rear followers relatively movable toward and away from each other; of a tapered friction post movable with each follower; friction shoes co-operating with each post; a wedge member co-operating with all of said shoes, said shoes and wedge member having co-operating sets of faces, certain of which are disposed at a relatively keen wedge-acting angle with respect to the longitudinal axis of the mechanism and others of which are disposed at a relatively blunt releasing angle with respect to said axis; and means for yieldingly resisting relative movement of each follower and the corresponding shoes.

In witness that I claim the foregoing I have hereunto subscribed my name this 21st day of December, 1925.

JOHN F. O'CONNOR.